United States Patent [19]

Seng

[11] Patent Number: 4,661,527
[45] Date of Patent: Apr. 28, 1987

[54] ONE-COMPONENT FORMULATION FOR DETACKIFYING, PRECIPITATING AND COAGULATING ANTI-CHIPPING COATINGS AND UNDERSEAL BASED ON WAXES, WAX-LIKE PLASTICS AND PLASTICS DISPERSIONS AND ALSO SYNTHETIC RESIN PAINTS IN WET SEPARATORS OF PAINT-SPRAYING INSTALLATIONS,

[75] Inventor: Hans-Peter Seng, Süssen, Fed. Rep. of Germany

[73] Assignee: Zeller & Gmelin GmbH & Co., Eislingen, Fed. Rep. of Germany

[21] Appl. No.: 742,514

[22] Filed: Jun. 7, 1985

[30] Foreign Application Priority Data

Jun. 7, 1984 [DE] Fed. Rep. of Germany ....... 3421257

[51] Int. Cl.$^4$ .............................. C08K 3/36; C08J 3/02
[52] U.S. Cl. ..................................... 521/55; 210/732; 210/735; 524/379; 524/391; 524/591; 524/273; 524/492
[58] Field of Search ............... 524/391, 379, 591, 273, 524/492, 493; 252/358; 210/732, 735; 521/54, 55

[56] References Cited

U.S. PATENT DOCUMENTS 4,211,683 7/1980 Wenzel et al. ...................... 524/591
4,277,380 7/1981 Williams et al. .................... 524/591
4,496,675 1/1985 Hille et al. .......................... 524/591
4,554,308 11/1985 Russiello ............................ 524/591

FOREIGN PATENT DOCUMENTS 49-1055  1/1974 Japan ..................................... 210/54
49-28349 7/1974 Japan ..................................... 210/54
49-46713 12/1974 Japan ..................................... 210/54

Primary Examiner—Lewis T. Jacobs
Attorney, Agent, or Firm—Burns, Doane, Swecker & Mathis

[57] ABSTRACT

The invention relates to a one-component formulation for detackifying, precipitating and coagulating anti-chipping coatings and underseal based on waxes, wax-like plastics and plastics dispersions and also synthic resin paints in wet paint mist separators of paint-spraying installations, using an additive which envelops the paint particles, which formulation comprises, as the additive, an aqueous polyurethane suspension which produces a paint sludge floating on the surface of the water.

The invention also relates to the use of the above one-component formulation for detackifying, precipitating and coagulating synthetic resin paints and anti-chipping coatings and underseal based on waxes, wax-like plastics and plastics dispersions and also synthetic resin paints in wet separators of paint-spraying installations, a floating paint sludge being obtained.

8 Claims, No Drawings

ONE-COMPONENT FORMULATION FOR DETACKIFYING, PRECIPITATING AND COAGULATING ANTI-CHIPPING COATINGS AND UNDERSEAL BASED ON WAXES, WAX-LIKE PLASTICS AND PLASTICS DISPERSIONS

FIELD OF THE INVENTION

DESCRIPTION

In paint-spraying installations, paint is sprayed under pressure through nozzles in fine dispersion onto objects, for example automobiles, which are to be painted. This is carried out in so-called spraying booths, spraying stations or on spraying walls. The paint mist thus formed must be removed again from the air. For this purpose, air contaminated with paint mists is drawn by means of fans through wet paint mist separators, in which water is passed through in countercurrent and brought into intimate contact with the air containing paint mists by means of inserts and the like. A wet paint mist separator of this type has been disclosed by German Auslegeschrift 1,269,594.

For precipitating and coagulating the paint particles deposited in the water which is continuously circulated in the wet separator, agents having an alkaline reaction, so-called paint detackifying or coagulating agents, are usually added to the water. This reduces the tendency of the paint particles to deposit on the walls of the wet separator and other structural elements, so that malfunctions and a considerable maintenance and cleaning effort are avoided. The transporting-away and the final storage of the paint sludge are also facilitated, when it consists of a nontacky paint coagulate.

A procedure of this type is described in German Offenlegungsschrift 2,758,873, which relates to a process for precipitating synthetic resin paints in wet paint mist separators of paint-spraying installations, using water adjusted to an alkaline reaction and containing an additive which envelops paint particles, which process comprises the use of an aqueous wax dispersion as the additive. In this case, the water is to be adjusted to a pH value of 8.0 to 13.5, concentrated aqueous caustic soda being used for this purpose. The wax dispersion used as the additive contains with advantage a mixture of montan wax and paraffin derivatives. This is a two-component formulation, since alkali is added separately, in addition to the wax dispersion.

Moreover, as practice has shown, this process requires working in the presence of surfactants, even though the use of surfactants is described therein only as being advantageous.

The process described also has the disadvantage that only a sedimenting paint sludge is obtained and that, consequently, it is applied only in large-scale installations, predominantly in the industry sector producing vehicles.

The function of further conventional coagulating agents is based on:
1. caustic soda and mineral oil,
2. caustic soda only,
3. acid, neutral or alkaline flocculating agents based on aluminum and iron salts, with an addition of polymeric acrylates as flocculating aids,
4. mixtures of sodium hydroxide, silicates and phosphates in powder form,
5. calcium chloride solutions and
6. wax dispersions and caustic soda.

All these coagulating agents are more or less capable of coagulating paints based on nitro, polyacrylate, polyester, polyurethane and wax underseal of conventional type in the form of a sedimenting coagulate. However, all the conventional coagulating agents, hitherto known, including those based on wax, are not capable of coagulating and detackifying highly filled underseal and 1 and 2 K anti-chipping coating types, to give a floating paint sludge.

It was therefore the object of the invention to provide a one-component formulation which is suitable for detackifying, precipitating and coagulating anti-chipping coatings and underseal based on waxes, wax-like plastics and plastics dispersions and also synthetic resin paints in wet paint mist separators of paint-spraying installations, a paint sludge floating on the surface of the water being formed, and which is largely satisfactory without further additions to the coagulating liquor, in particular without the addition of an antifoam.

These objects are achieved by the use of an aqueous polyurethane suspension as the additive.

The subject of the invention is therefore a one-component formulation for detackifying, precipitating and coagulating anti-chipping coatings and underseal based on waxes, wax-like plastics and plastics dispersions and also synthetic resin paints in wet paint mist separators of paint-spraying installations, using an additive which envelops the paint particles, which formulation comprises, as the additive, an aqueous polyurethane suspension which produces a paint sludge floating on the surface of the water.

If the anti-chipping coating or underseal is based on plastics dispersions, this plastic is, for example, PVC.

According to a preferred embodiment of the invention, the polyurethane suspension contains a mixture of an aliphatic alcohol having 1 to 3 carbon atoms and poly-[oxyethylene-(dimethyliminio)-ethylene]-dichloride.

A specific one-component formulation of the type defined in accordance with the invention comprises
(a) 1–8%, preferably 2–5%, of an aliphatic alcohol having 1–3 carbon atoms,
(b) 0.01–1.0%, preferably 0.2–0.5%, of pyrogenic silica having a specific surface area of 50–380 m$^2$/g,
(c) 3–20%, preferably 4–10%, of poly-[oxyethylene-(dimethyliminio)-ethylene]-dichloride and
(d) 10–30%, preferably 15–25%, of polyurethane powder, each relative to the weight of the formulation, the remainder of the formulation being represented by water.

A preferred one-component formulation according to the invention has the following composition:

| | |
|---|---|
| Water | 74.5% by weight |
| Propan-2-ol | 3.0% by weight |
| Pyrogenic silica having a specific surface area of 200 m$^2$/g | 0.5% by weight |
| Poly-[oxyethylene-(dimethyliminio)-ethylene]-dichloride | 4% by weight |
| Polyurethane powder (particle size less than 1 μm) | 18.0% by weight |

This specific one-component formulation has the following physical data:

| | |
|---|---|
| Color | Light brown, pasty |
| Bulk density | 0.8 g/cm$^3$ |
| pH value of 10% dispersion | 7.9 |

The aliphatic alcohols, having 1 to 3 carbon atoms, of component (a) can in particular be ethanol and propan-2-ol, and also methanol, even though the lastmentioned is less preferred on account of its toxicity. Preferably, propan-2-ol is used.

The pyrogenic silica used as component (b) is obtained by combustion of silicon tetrachloride to give silicon dioxide. The range of its specific surface area is 50 to 380 m$^2$/g, and preferably this is of the order of magnitude of 200 m$^2$/g. The mean size of the primary particles of the pyrogenic silica is in general in the range from 10 to 20 nm, in particular about 12 nm. the size of the primary particles plays a role in establishing a skeleton structure in the aqueous suspension.

The poly-[oxyethylene-(dimethyliminio)-ethylene]-dichloride, used as component (c), is an active flocculating agent, which is distinguished by an algicidal and bactericidal action. Component (c) is prepared from dichloroethyl ether

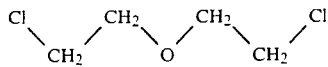

and tetramethylethylenediamine

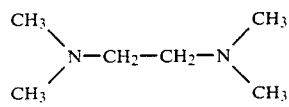

A poly-[oxyethylene-(dimethyliminio)-ethylene]-dichloride used preferably as the component (c) has a density of 1.15 g/cm$^3$ (at 25°C.) and a flash point of 108°C. in the Cleveland open cup.

The polyurethane powder used as component (d) can be a waste material from the production of integral foams, the use of which in the present case represents an advantageous waste utilization. The preparation of such polyurethanes is known from the specialist literature. The rigid polyurethane integral foam is produced on a large scale from:

polyols and
polyisocyanates based on diphenylmethane 4,4'-diisocyanate.

Under the action of special catalysts, these polyisocyanates are capable of polymerizing, together with the polyols, to give plastics which are processed, as the result of using blowing agents, into foam-like microporous materials. Even the grinding dust from these polyurethane foams still contains, in the small dust grains, air occlusions which retain the polyurethane dust at the surface of the water. Only by way of example, starting components for the preparation of polyurethane powders, which can be used here, are indicated below.

| Isocyanate components: Diphenylmethane 4,4'-diisocyanate (MDI) and derivatives of this compound. Tradenames of these products: | |
|---|---|
| Desmodur 44 P90 ® | (modified MDI, N=C=O content 28%, viscosity 100–160 mpa.s at 25° C.) |
| Desmodur 44 V10B ® | (MDI polymer, N=C=O content 31%, viscosity 110–150 mpa.s at 25° C.) |
| Desmodur 44 P01 ® | (modified MDI, N=C=O content 29%, viscosity 120–180 mpa.s at 25° C.) |

| Polydiols: | |
|---|---|
| Baydur 6110B ® | Polyether-polyol, OH number 480, viscosity 1,100 mpa.s at 25° C. |
| Baydur 6130V ® | Polyether-polyol, OH number 490, viscosity 1,000 mpa.s at 25° C. |
| Baydur 6310S ® | Polyether-polyol, OH number 435, viscosity 2,850 mpa.s at 25° C. |
| Baydur 6320M ® | Polyether-polyol, OH number 435, viscosity 2,850 mpa.s at 25° C. |
| Baydur 6410L ® | Polyether-polyol, OH number 365, viscosity 2,400 mpa.s at 25° C. |
| Baydur 6510F ® | Polyether-polyol, OH number 495, viscosity 2,300 mpa.s at 25° C. |
| Baydur 6520B ® | Polyether-polyol, OH number 505, viscosity 2,900 mpa.s at 25° C. |

The polyurethane powder is used in this case as a coagulating agent. Its particle size must be smaller than 1 μm, since unduly coarse urethane particles do not have an adequate coagulating effect. Moreover, its density (bulk density) within the range from 0.6 to 0.8 g/cm$^3$ can also be of importance for the functioning of the polyurethane powder as a coagulating agent.

Since polyurethane shows a predominantly hydrophobic reaction in water, a spontaneous aggregation of hydrophobic paint particles and hydrohobic polyurethane particles takes place on contact with paint spray mists which strike the surface of the water. Due to this agglomeration, the originally tacky paint is detackified and can be removed from the painting installation without problems.

The aliphatic alcohol having 1 to 3 carbon atoms and used as component (a) ensures a contact between the water and the polyurethane powder and enables a polyurethane suspension in water to be prepared. If this suspension, during its use, is greatly diluted by relatively large quantities of water in the painting installation, the contact promoter (aliphatic alcohol having 1 to 3 carbon atoms) loses its effectiveness and the polyurethane powder is repelled by the water. Since the polyurethane powder was obtained from integral foam, the powder also has air occlusions which cause it to float to the surface. The hydrophobic polyurethane powder floating on the surface of the water "reacts" with the likewise hydrophobic paint particles, which strike the surface of the water in the form of a spray mist, to form agglomerates. The polymeric active flocculating agent (component (c)) is adsorbed on the surface of the polyurethane/paint agglomerate. On the one hand, the adsorption layer detackifies the agglomerates and, on the other hand, by "bridge formation" it forms larger agglomerations which can be skimmed from the surface of the water without problems.

The simultaneous bactericidal, algicidal and fungicidal action of the active flocculating auxiliary (component (c)) is shown by the following data.

| | |
|---|---|
| *Aerobacter aerogenes* | 0.3–1 ppm minimum growth-inhibiting concentration of active substance |

| | | |
|---|---|---|
| -continued | | |
| *Desulfovibrio desulfuricans* | 30 ppm | minimum growth-inhibiting concentration of active substance |
| *Legionella pneumophila* (legionnaires' disease) | 200 ppm | minimum growth-inhibiting concentration of active substance |
| Algae: | | |
| *Chlorella pyrenoidosa* | 2 ppm | minimum growth-inhibiting concentration of active substance |
| *Chlorococcum hyposporum* | 2 ppm | minimum growth-inhibiting concentration of active substance |
| *Phormidium inundatum* | 8 ppm | minimum growth-inhibiting concentration of active substance |

The formulation according to the invention can be prepared as follows:

The water is introduced first and the aliphatic alcohol having 1 to 3 carbon atoms, the silica and the poly-[oxyethylene-(dimethyliminio)-ethylene]-dichloride are stirred in. The polyurethane powder is then intensively mixed with the liquid mixture present by means of a stirring implement (for example a slowly rotating anchor stirrer). This gives a paste which has thixotropic properties. This paste can be stirred and pumped.

In a further possibility for preparing the formulation according to the invention, the polyurethane powder is introduced first into a mixer or kneader, and the mixture of water, active flocculating agent, aliphatic alcohol having 1 to 3 carbon atoms and pyrogenic silica is slowly kneaded in.

The one-component formulation according to the invention is suitable, inter alia, for detackifying, precipitating and coagulating solvent-containing paints based on acrylics and polyester, and highly filled underseal and anti-chipping coatings, in particular solvent-containing top coats based on synthetic resins, metallic primers and metallic clear finish as well as primers and highly filled 1K and 2K anti-chipping coatings. This produces a stable, floating and detackified paint sludge. The formulation according to the invention functions without foam even when used in excess, so that an additional use of antifoams is unnecessary. It functions also when used in excess in the neutral pH range. Since the active substance shows hydrophobic behavior, it does not pollute the effluent water.

The formulation according to the invention is suitable as an additive in paint-spraying booths and paint-spraying stations with a wash-out system. It detackifies paints and underseal types completely, so that work free from interruptions is ensured in the installations. The cleaning effort is minimized and the life of the coagulation liquor is considerably extended. In addition, the formulation according to the invention has an algicidal, bactericidal and fungicidal action.

In detail, the formulation according to the invention can be fed undiluted to the circulating water via an eccentric screw pump or as an at most 50% dispersion, diluted with water, via a metering piston pump.

The particular addition rate depends on the type and paint quantity, which is to be detackified. The type of installation and the mode of operation also play an important role. The optimum addition rate is determined for each particular use in practice. The following base data may here be assumed:

If the formulation according to the invention is metered as a concentrate into the coagulation liquor:

| | |
|---|---|
| Base addition: | 0.1–0.2%, relative to the water volume of the painting installation; |
| further addition: | 1 kg of formulation per 3–5 kg of overspray quantity. |

The base addition should here not exceed 0.2%, since otherwise large quantities of active substance can be transferred unutilized into the paint sludge.

In the case of direct addition into the spraying agent:

| | |
|---|---|
| Base addition: | none; |
| further addition: | 0.1–0.5 kg of formulation per 1 kg of overspray quantity. |

The effect of the formulation according to the invention, as described (complete detackification and floating coagulation of paints and above all of anti-chipping coating types which cause problems in coagulation), is to be ascribed inter alia to the following features which distinguish it from conventional coagulants:

(a) it is free of surface-active substances;
(b) it is free of salt-like, corrosion-promoting flocculating agents;
(c) it is free of flocculating aids which infest the washing liquor with bacteria within a short time and
(d) it is free of alkali components.

A further subject of the invention is therefore the use of the present one-component formulation for detackifying, precipitating and coagulating anti-chipping coatings and underseal based on waxes, wax-like plastics and plastics dispersions and also synthetic resin paints in wet separators of paint-spraying installations, a floating paint sludge being obtained.

The example which follows explains the invention.

EXAMPLE

A one-component formulation of the following composition is prepared:

| | |
|---|---|
| Water | 74.5% by weight |
| Propan-2-ol | 3.0% by weight |
| Pyrogenic silica having a specific surface area of 200 m$^2$/g | 0.5% by weight |
| Poly-[oxyethylene-(dimethyliminio)-ethylene]-dichloride (density: 1.15 g/cm$^3$ (at 25° C.); flash point in the Cleveland open cup: 108° C.) | 4.0% by weight |
| Polyurethane powder of a particle size of less than 1 μm | 18.0% by weight |

For this purpose, propan-2-ol and silica as well as the poly-[oxyethylene-(dimethyliminio)-ethylene]-dichloride are stirred into the water introduced first. The polyurethane powder is then intensively mixed with the prepared liquid mixture by means of a slowly rotating anchor stirrer. This gives a paste which has thixotropic properties and can be stirred and pumped.

Using this paste, solvent-containing top coats based on synthetic resins, Primers and highly filled 1K and 2K anti-chipping coatings are detackified and coagulated, a suspended coagulate which tends to float in water being obtained.

I claim:

1. A one-component formulation for detackifying, precipitating and coagulating an anti-chipping coating or underseal based on wax, wax-like plastic or plastic dispersions, or synthetic resin paint in an aqueous mixture comprising an additive which envelopes paint particles, said additive being an aqueous suspension of polyurethane foam particles which comprises:
   (a) 1—8% of an aliphatic alcohol having 1-3 carbon atoms,
   (b) 0.01—1.0% of pyrogenic silica having a specific surface area of 50-380 m$^2$/g,
   (c) 3—20% of poly-[oxyethylene -(dimethyliminio)-ethylene] dichloride and
   (d) 10—30% of polyurethane foam powder,
each relative to the weight of the formulation, the remainder of the formulation being represented by water.

2. The one-component formulation as defined by claim 1 comprising 2-5% of said aliphatic alcohol having 1-3 carbon atoms.

3. The one-component formulation as defined by claim 1 comprising 0.2-0.5% of said pyrogenic silica.

4. The one component formulation as defined by claim 1 comprising 4-10% of poly-[oxyethylene-(dimethylimino)-ethylene ]-dichloride.

5. The one-component formulation as defined by claim 1 comprising 15-20% of said polyurethane powder.

6. A method for precipitating, detackifying and coagulating anti-chipping coating or underseal based on wax, wax-like plastic or plastic dispersions, or synthetic resin paint in a web paint separator to obtain a floating paint sludge comprising adding a one-component formulation which comprises an aqueous suspension of polyurethane foam particles.

7. The method as claimed in claim 6, wherein said aqueous suspension of polyurethane foam particles comprises:
   (a) —8% of an aliphatiuc alcohol having 1-3 carbon atoms,
   (b) 0.01—1.0% of pyrogenic silica having a specific surface area of 50-380 m$^2$/g,
   (c) 3—20% of poly-[oxyethylene -(dimethylimino)-ethylene] dichloride and
   (d) 10—30% of polyurethane foam powder,
each relative to the weight of the formulation, the remainder of the formulation being represented by water.

8. The method as claimed in claim 6, wherein said aqueous suspension of polyurethane foam particles comprises:
   (a) 2—5% of an aliphatic alcohol having 1-3 carbon atoms,
   (b) 0.2—0.5% of pyrogenic silica having a specific surface area of 50-380 m$^2$/g,
   (c) 4—10% of poly-[oxyethylene -(dimethylimino)-ethylene] dichloride and
   (d) 15—25% of polyurethane foam powder,
each relative to the weight of the formulation, the remainder of the formulation being represented by water.

* * * * *